(12) United States Patent
McGeehan et al.

(10) Patent No.: US 8,869,243 B2
(45) Date of Patent: Oct. 21, 2014

(54) AUTHENTICATING USER SESSIONS BASED ON REPUTATION OF USER LOCATIONS

(75) Inventors: Ryan McGeehan, Palo Alto, CA (US); Lev Timourovich Popov, Palo Alto, CA (US); Christopher William Palow, San Francisco, CA (US); Robert J. Read, Burlingame, CA (US); Pedram Keyani, San Carlos, CA (US)

(73) Assignee: Facebook, Inc., Menlo Park, CA (US)

( * ) Notice: Subject to any disclaimer, the term of this patent is extended or adjusted under 35 U.S.C. 154(b) by 837 days.

(21) Appl. No.: 12/646,803

(22) Filed: Dec. 23, 2009

(65) Prior Publication Data
US 2010/0211997 A1 Aug. 19, 2010

Related U.S. Application Data

(60) Provisional application No. 61/140,928, filed on Dec. 26, 2008, provisional application No. 61/144,711, filed on Jan. 14, 2009.

(51) Int. Cl.
G06F 7/04 (2006.01)
G06F 21/31 (2013.01)

(52) U.S. Cl.
CPC ................................. *G06F 21/316* (2013.01)
USPC ........................................................... 726/4

(58) Field of Classification Search
USPC .............................. 726/2–5, 7, 21–23, 26–29
See application file for complete search history.

(56) References Cited

U.S. PATENT DOCUMENTS

| | | |
|---|---|---|
| 7,376,431 B2 | 5/2008 | Niedermeyer |
| 7,818,392 B1 | 10/2010 | Martino et al. |
| 2004/0059951 A1* | 3/2004 | Pinkas et al. .................. 713/202 |
| 2006/0069921 A1 | 3/2006 | Camaisa et al. |
| 2006/0282660 A1* | 12/2006 | Varghese et al. .............. 713/155 |
| 2009/0089869 A1 | 4/2009 | Varghese |
| 2011/0161492 A1* | 6/2011 | Granville ...................... 709/224 |
| 2012/0310836 A1 | 12/2012 | Eden et al. |

OTHER PUBLICATIONS

Initiative for Open Authentication, "OATH Reference Architecture Release 1.0," 2004-2005, pp. 1-38, can be retrieved at <http://www.openauthentication.org/webfm_send/13>.

Initiative for Open Authentication, "OATH Reference Architecture Release 2.0," 2004-2007, pp. 1-50, can be retrieved at <http://www.openauthentication.org/webfm_send/1>.

M'Raihi, D., et al., "HOTP:An HMAC-Based One-Time Password Algorithm," The Internet Society, Dec. 2005, pp. 1-31, can be retrieved at <http://www.iett.org/rfc/rfc4226.txt>.

* cited by examiner

*Primary Examiner* — Brandon Hoffman
(74) *Attorney, Agent, or Firm* — Fenwick & West LLP

(57) ABSTRACT

User sessions are authenticated based on locations associated with a user account used for sending a request for creating a session. Examples of locations of a source of a request include a geographical location, a network address, or a machine cookie associated with a device sending the request. Locations of the request are compared with stored safe locations associated with the user account and a suspiciousness index is determined for the session. The level of authentication required for the session is determined based on the suspiciousness index. Locations are associated with a reputation based on past history of sessions originating from the locations. A location associated with a history of creating suspicious session is considered an unsafe location. Reputation of the location originating the session is used to determine the level of authentication required for the session.

22 Claims, 5 Drawing Sheets

AUTHENTICATING USER SESSIONS BASED ON REPUTATION OF USER LOCATIONS

CROSS REFERENCES TO RELATED APPLICATIONS

This application claims the benefit of U.S. Provisional Application No. 61/140,928, filed Dec. 26, 2008, and U.S. Provisional Application No. 61/144,711, filed Jan. 14, 2009, each of which is incorporated by reference in its entirety.

BACKGROUND

This invention relates to preventing illegitimate use of compromised accounts, such as account for which the credentials have been stolen by phishing sites.

Phishing is a fraudulent attempt to obtain confidential information from users, such as user names, passwords, account numbers and the like, by pretending to be a legitimate online entity. A fraudulent website presents a look and feel that is almost identical to a legitimate website that may be a popular and trusted website. Unsuspecting users who are unaware that they are interacting with a fraudulent website provide sensitive information to the fraudulent website. For example, a user may be habitually accustomed to providing username and password to a social networking website frequently visited by the user. On a specific occasion, if the user is presented with a fraudulent website that has the look and feel of the social networking website, the user may proceed by providing his user name and password to the fraudulent website. The fraudulent website obtains the user name and password of the user and can subsequently use it for unauthorized access to the social networking website. Similarly, a fraudulent website may be able to collect sensitive information, for example, credit card numbers, social security numbers, or date or birth of users by pretending to look like a legitimate website. Once user credentials have been compromised, the stolen credentials can be used for illegitimate purposes. Damages from phishing include stealing of information as well as substantial financial losses.

Strategies for counteracting phishing include training people to distinguish phishing websites from legitimate websites. Users may be encouraged to contact the company hosting the website in case of any suspicion related to the website. Users are encouraged to verify the uniform resource locator (URL) address displayed in an Internet browser to ensure that they are in fact accessing the website that they intend to access. To avoid phishing, some websites require enhanced authentication procedures, for example, by requesting the user to identify an image preselected by the user. Once a user's account has become compromised, however, websites must try to prevent or limit the damage caused by phishing by determining whether a user session is legitimate or is from an unauthorized person who obtained a user's account information unlawfully.

SUMMARY

Embodiments of the invention allow authentication of user sessions based on reputation of locations associated with user sessions. A location associated with a request for information received from a computing device is identified. A measure of reputation associated with the location is received. The measure of reputation of the location is determined based on statistical information of suspicious sessions originating from the location. The measure of reputation of the location is used to determine the level of authentication required from the sender of the request. Based on the level of authentication required, a request for authentication is sent.

In one embodiment, if the reputation of the location indicates that the location originated more than a threshold number of suspicious sessions in the past, the location is considered unsafe. In another embodiment, the reputation of a location may be based on the reputation of a neighboring location. In another embodiment, the reputation of a location may be based on the distance of the location from a neighboring location. Embodiments determine past sessions as suspicious if the sessions are associated with illegitimate activities, or if the sessions request information that is considered sensitive, or if the sessions fail authentication. The information for determining a measure of reputation of location may be obtained from a third party.

In one embodiment, a server determines measures of reputations of locations and stores them. Information related to sessions originating from a location is received. A measure of suspiciousness indicating authenticity of the session originating from the location is determined. A measure of reputation of the location is determined based on an aggregate of measures of suspiciousness of sessions originating from the location. The measure of reputation of the location is used to determine the level of authentication required for subsequent sessions originating from the location. The measure of reputation associated with the location is stored in a computer readable medium.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

When a user interacts with a website, a session is created by the website for the user interaction. The user interaction may involve the user logging into the website or accessing a webpage from the website. The website can analyze the user session to gather location information associated with the client device and/or the session. The information associated with the client device used for the session includes geographical location, attributes of the physical machine used by the user, the network address associated with the session created by the user and the like. A typical user is likely to create a session from the same set of locations on a regular basis, for example, a person may connect daily from a home computer or a work computer. A user is also likely to connect from another computer within a reasonable distance of his home or work, for example, from a computer in a library. However a user is less likely to connect from a computer that is very far from the usual locations associated with the user. Accordingly, a session created from a new distant location can be considered suspicious and may require higher level of authentication. A suspicious session is a session that has a greater than a threshold likelihood of being created by a user that is not authorized to use the user account associated with the session. An authorized user of a user account can be a user that created the session or a user who is legitimately permitted to create a session using the user account. For example, a user that creates a session using credentials stolen by a phishing website is not an authorized user of the user account. Higher the level of authentication passed by a session, lower the likelihood of the session being created by an unauthorized user. User locations, for example, geographical locations or netblocks originating sessions can be associated with a reputation based on past history of sessions created from the locations. An attempt to create a session from a location with a history of suspicious sessions can be considered suspicious, thereby requiring higher level of authentication.

System Architecture

Figure 1:
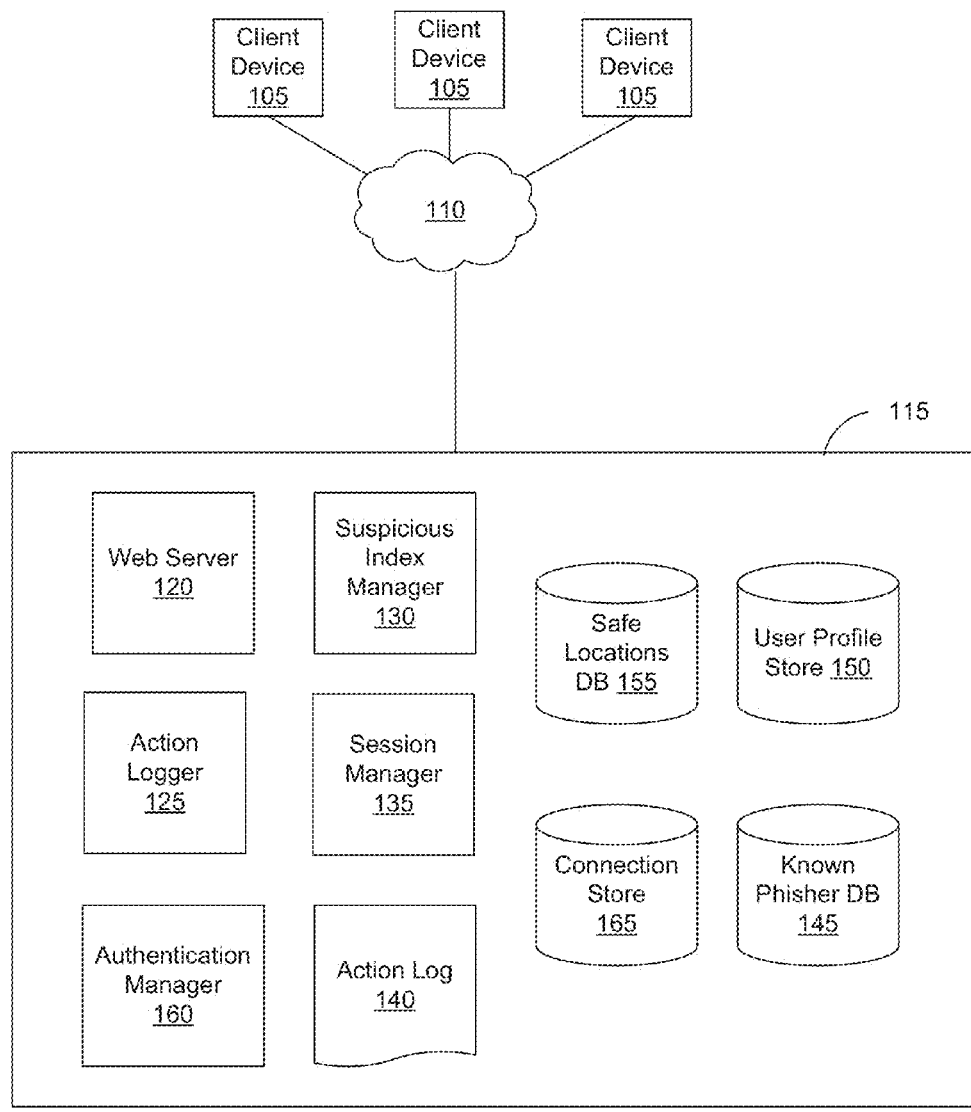
FIG. 1 is a diagram of the system architecture of a website, in accordance with an embodiment of the invention.

FIG. 1 is a high level block diagram illustrating a system environment suitable for operation of a social networking system that prevents phishing attacks from fraudulent websites. The system environment comprises one or more client devices 105, a social networking system 115, and a network 110. In alternative configurations, different and/or additional modules can be included in the system.

The client devices 105 comprise one or more computing devices that can receive user input and transmit and receive data via the network 110. For example, the client devices 105 may be desktop computers, laptop computers, smart phones, personal digital assistants (PDAs), mobile phones, or any other device including computing functionality and data communication capabilities. The client devices 105 are configured to communicate via network 110, which may comprise any combination of local area and/or wide area networks, using both wired and wireless communication systems.

FIG. 1 contains a block diagram of the social networking system 115. The social networking system 115 includes a web server 120, an action logger 125, a session manager 135, a suspicious index manager 130, an authentication manager 160, an action log 140, a user profile store 150, a safe locations database (DB) 155, a known phisher DB 145, and a connection store 165. In an embodiment, the social networking system 115 can be a website. In other embodiments, the social networking system 115 may include additional, fewer, or different modules for various applications. Conventional components such as network interfaces, security mechanisms, load balancers, failover servers, management and network operations consoles, and the like are not shown so as to not obscure the details of the system.

The social networking system 115 comprises a computing system that allows users to communicate or otherwise interact with each other and access content as described herein. The social networking system 115 stores user profiles that describe the users of a social network, including biographic, demographic, and other types of descriptive information, such as work experience, educational history, hobbies or preferences, location, and the like. The social networking system 115 further stores data describing one or more connections between different users in the connection store 165. The connection information may indicate users who have similar or common work experience, group memberships, hobbies, or educational history. Additionally, the social networking system 115 includes user-defined connections between different users, allowing users to specify their relationships with other users. For example, these user defined connections allow users to generate relationships with other users that parallel the users' real-life relationships, such as friends, co-workers, partners, and so forth. Users may select from predefined types of connections, or define their own connection types as needed.

The web server 120 links the social networking system 115 via the network 110 to one or more client devices 105; the web server 120 serves web pages, as well as other web-related content, such as Java, Flash, XML, and so forth. The web server 120 may include a mail server or other messaging functionality for receiving and routing messages between the social networking system 115 and the client devices 105. The messages can be instant messages, queued messages (e.g., email), text and SMS (short message service) messages, or any other suitable messaging technique.

The session manager 135 handles sessions created by the client device 105 during interactions with the social networking system 115. For example, a session is created when a user uses a client device 105 to log into the social networking system 115 or fetches web pages from the social networking system 115. The session manager 135 can analyze the information received from the client device 105 to identify information associated with the client device 105 based on communications with the client device 105, for example, the internet protocol (IP) address used by the client device for communicating with the social networking system 115 or machine cookies stored on the client device 105.

The suspicious index manager 130 obtains the information associated with a session created by the user and analyzes the information to determine the probability that the session was created for a legitimate use by the authentic user of the account as compared to an illegitimate use by someone who stole the user's credentials. The suspicious index can be in the form of a numerical score assigned to a user session indicating the chances that the session is created by an illegitimate user or it can be a value from a predetermined set of values indicating the degree of suspicion associated with the session's authenticity, for example, low, medium, or high degree of suspicion. In another embodiment, the suspicious index can be a binary value indicating whether the user session is safe or not safe. The suspicious index associated with a session may be provided to other modules or systems within the social networking system 115 in real-time as new sessions are created. Alternatively, the suspicious index may be used by off-line applications that perform batch processing, for example, based on information available in the action log 140. For example, an application can perform statistical analysis of illegitimate activity associated with user accounts on the social networking system 115.

The authentication manager 160 obtains user credentials from a user creating a session and authenticates actions based on the session. For example, the login and password information is collected from a user and verified against information from the user profile store 150 before allowing the user access to information. Based on the degree of suspicion associated with a user session as determined by the suspicious index manager 130, the authentication manager 160 may require different levels of authentication from a user before allowing access to the user based on the user session. For example, a low degree of suspicion associated with a session may result in authentication manager allowing access to information with simple authentication based on login and password. On the other hand a highly suspicious index associated with a session by the suspicious index manager may cause the authentication manager to require additional authentication or to use a more sophisticated authentication mechanism that results in a higher rate of success compared to simpler authentication mechanisms.

In one embodiment, additional logging is performed when a session is determined to be suspicious to enable subsequent analysis of the suspicious sessions. Some embodiments may send alerts to appropriate recipients when a session is determined to be highly suspicious. The recipients of the alerts can take appropriate remediation action depending on the severity of the actions taken by a suspicious session.

The action logger 125 is capable of receiving communications from the web server 120 about user actions on and/or off the social networking system 115. The action logger 125 populates the action log 140 with information about user actions to track them. Any action that a particular user takes with respect to another user is associated with each user's profile, through information maintained in a database or other data repository, such as the action log 140. Such actions may include, for example, adding a connection to the other user, sending a message to the other user, reading a message from the other user, viewing content associated with the other user, attending an event posted by another user, among others. In addition, a number of actions described below in connection with other objects are directed at particular users, so these actions are associated with those users as well. When a user takes an action on the social networking system 115, the action is recorded in an action log 140. In one embodiment, the social networking system 115 maintains the action log 140 as a database of entries. When an action is taken on the social networking system 115, the social networking system 115 adds an entry for that action to the log 140.

The known phisher DB 145 stores information associated with sessions that have been used by illegitimate users of compromised credentials in the past. An illegitimate user can be any attacker, adversary, or a phisher who has stolen login credentials of a user and attempts to use the stolen credentials to create a session for illegitimate activity, for example spamming. This information is stored for ready access to recognize if a session is illegitimate by verifying the session attributes against the information stored in the known phisher DB 145. Such sessions may be immediately denied access. The known phisher DB 145 also stores information derived from the information on suspicious sessions. For example, the known phisher DB may store a list of unsafe netblocks that have originated unsafe sessions in the past as well as list of safe netblocks that have originated safe sessions in the past. A netblock is a set of internet protocol (IP) addresses that are grouped together. For example, a netblock can be represented as a range of IP addresses comprising a start IP address and an end IP address. A netblock may be associated with an organization or a location. In another embodiment, the known phisher DB stores a list of known netblocks with each netblock associated with a safety metric indicating how safe the sessions originating from the netblock have been in the past. The suspicious index manager 130 uses the information from the known phisher DB 145 to determine the suspicious index associated with a new session that connects with the social networking system 115. For example, a session originating from a netblock considered unsafe based on historical data associated with the netblock can be assigned a suspicious index value indicating the session as highly suspicious.

FIG. 1 shows the safe locations DB 155 that stores information associated with each user based on sessions created in the past that have been properly authenticated and determined to be created by legitimate users. The information associated with a user can be retrieved from the safe locations DB 155 given parameters associated with the user to identify the user. The information in the safe locations DB 155 is used by the suspicious index manager 130 to determine the suspicious index of a user session. The information stored in the safe locations DB 155 is accumulated over time as the user creates more and more sessions. The information may be collected through offline processes that analyze information available in action log 140 or collected in real time as user sessions are created, and the quality of the process for determining the safety of subsequent user sessions is likely to improve over time. A new session created by a user that matches information associated with the user in the safe locations DB 155 is more likely to be a legitimate session. On the other hand a session associated with information that is drastically different from the information available in the safe locations DB 155 is highly suspicious and may be considered a session created by an illegitimate user, unless the session passes through enhanced authentication. For example, if a geographic location associated with the session is very far from all geographical locations associated with the user stored in the safe locations DB 155, the session may be considered highly suspicious. The locations of the session may be added to the safe locations DB 155 if the session passes the required enhanced authentication.

In an embodiment, statistical information based on locations associated with a user stored in the safe locations DB can be analyzed to classify the user behavior for use in determining suspiciousness of future user sessions. For example, if the safe locations of a user are typically far apart from each other on a regular basis, the user may be a travelling user, for example, a sales person. In this case, a new session that is associated with a geographical location that is far from the existing safe locations of the user may not be considered a highly suspicious session. On the other hand, if the safe locations associated with the user are typically restricted to a very small geographical region, the user is not likely to travel a lot. Hence, a new session associated with a geographical location that is far from the existing safe locations of the user may be considered a highly suspicious session and may require enhanced authentication procedure.

Using the Reputation of a Session's Origin Location

In one embodiment, data regarding user sessions are analyzed to determine whether user sessions are associated with potentially harmful behavior (e.g., activities representing spamming, phishing, or other improper behavior). For example, an illegitimate session created using stolen credentials from the user from a vetted geographical location of a user may be considered not-suspicious and allowed access. However information related to activities of the session is stored in action log 140 and can be analyzed by a post-processing step. Embodiments of a process for analyzing whether a session is suspicious are described in further details below. Based on the analysis, if it is determined that the session was involved in illegitimate activities, the session may be considered invalid, or suspicious, and the suspiciousness measure of the location from which the session originated may be high, indicating the location as more suspicious. In one embodiment, a netblock associated with a large number of suspicious sessions (e.g., above a predetermined threshold) that were not properly authenticated may be considered a bad location.

If a sufficient number of user sessions are determined to be suspicious for a particular netblock, the netblock is considered bad, or unsafe. The netblocks considered not safe are stored in a database that maintains a list of unsafe netblocks. Netblocks that are known to be "safe" (e.g., having a relatively low rate of invalid sessions) may also be maintained in a list of safe netblocks. In some embodiments, locations other than netblocks can be stored in a database of bad locations. For example, IP addresses obtained from invalid sessions can be stored in a list of bad IPs. Alternatively, geographical locations that have a high rate of invalid sessions are considered not safe and stored in a database that maintains a list of unsafe geographical locations. Geographical locations that are known to be "safe" (e.g., having a relatively low rate of invalid sessions) may also be maintained in a list of safe geographical locations. The safe and unsafe geographical locations lists can be used similar to the safe and unsafe netblock lists to determine safety of sessions.

Figure 2:
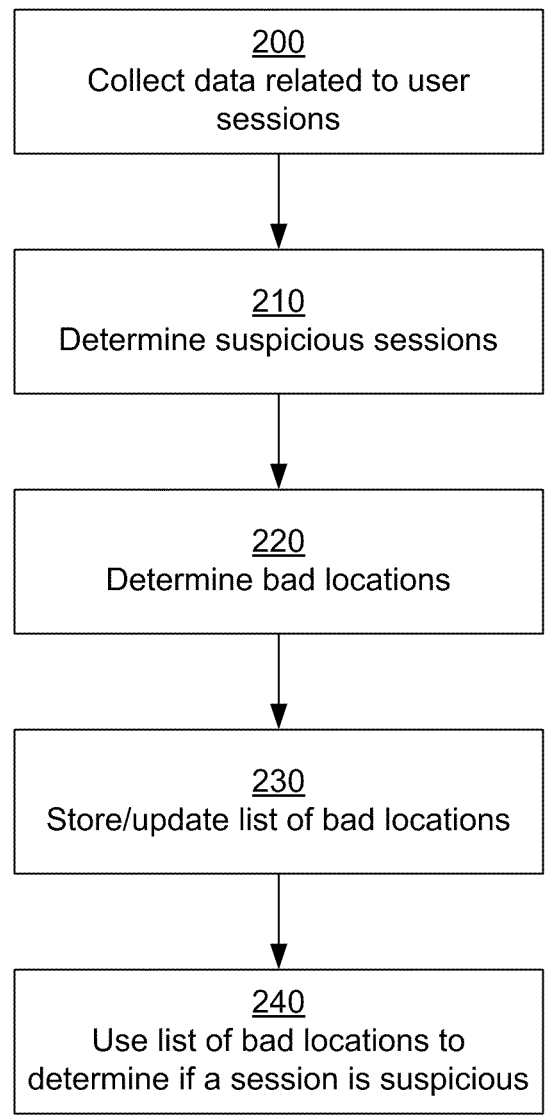
FIG. 2 illustrates a process of building a store of bad locations based on session data.

FIG. 2 describes a process of building a store of bad locations based on data collected for sessions. On an ongoing basis, data is collected 200 for sessions, for example by logging in the action log 140. The data collected for sessions includes whether the sessions were suspicious and the location (e.g., netblock) from which the sessions originated. The session data collected is examined by the suspicious index manager 130 to determine 210 whether each session is suspicious. The suspicious index manager 130 uses the information related to suspicious sessions to determine 220 whether certain locations (e.g., netblocks) are suspicious or "bad" locations. For example, a netblock may be determined to be a "bad" location if it is a location for a number of suspicious sessions above a predetermined threshold. A list of the bad locations is computed and stored or added 230 to a previously stored list of bad locations. The list of bad locations is used 240 to determine if a new user session is suspicious. A session with a location that belongs to the list of bad locations may be required to pass an enhanced authentication. For example, the check 510 in FIG. 5 described in further details below may use the list of bad locations as a factor in determining if a session is suspicious or not.

When the session manager 135 creates a new user session, the session manager 135 checks the netblock of the new session against the list of unsafe netblocks (and optionally the list of safe netblocks) stored in the known phisher DB 145 to determine if the netblock has a bad reputation based on the gathered historical data. If the session manager 135 finds the netblock of the new session in the unsafe list of netblocks, the new session may be considered highly suspicious. Alternatively, if the netblock of the new session is found in the safe netblock list, the session may be considered less suspicious. If a new user session is considered suspicious, the authentication manager 160 may apply an enhanced or more difficult authentication procedure, such as a captcha, an additional password, or other security verification mechanism. Embodiments of enhanced authentication procedures are described in further details below.

An alternative embodiment maintains a list of known netblocks and associates each netblock with a safety metric indicative of the degree of safety of sessions originating from the netblock in the past. The netblock associated with the new user session is determined to be safe or unsafe by comparing the suspicious index associated with the netblock with predetermined threshold values. For example, a netblock with a suspicious index value above a predetermined threshold may be considered unsafe. Hence, a netblock can be classified based on the degree of safety based on historical data associated with the netblock. The safety metric associated with a netblock is used in subsequent sessions to determine their suspicious index. A session originating from a netblock with safety metric indicative of low safety is considered suspicious and may be subjected to enhanced authentication.

The suspicious index manager 130 may determine the reputation of a netblock based on an aggregate value determined based on reputations of individual network addresses within the netblocks. The netblock may be considered unsafe if the percentage of network addresses that are considered suspicious is above a predefined threshold. A network address is considered suspicious if sessions created using the network address are considered suspicious. A session is considered suspicious if the session either fails authentication or attempts to access sensitive information. Each network address of the netblock may be associated with a safety metric indicative of the suspiciousness of network address. The safety of the netblock is determined based on a statistical measure based on an aggregate value of the safety metrics for all the network addresses in the netblock. In an embodiment, the reputation of a geographical location is based on the reputation of netblocks within the geographical location. If the geographical location is associated with a single netblock, the safety metric associated with the geographical location is determined based on the reputation of the associated netblock. If the geographical region is associated with multiple netblocks, the reputation of the geographical location may be based on a statistical aggregate value of metrics associated with reputations of netblocks within the geographical location. In an embodiment, the reputation of a geographical location may be determined on the basis of hierarchical decomposition of the geographical location into smaller geographical location and recursively combining the reputation of the smaller geographical locations.

In some embodiments, user behavior indicative of actions that are not useful for illegitimate purposes can be considered an indication that the locations associated with the session are safe. The types of actions that are unlikely to be useful for illegitimate purposes will vary widely depending on the type of system the users are interacting with. It will be appreciated that any number of actions can be used as an indication of legitimate behavior, and these actions may be observed and determined empirically for each particular system with which embodiments of the invention are used. One source of legitimate actions may include, for example, accessing data from the social networking system 115, for example by browsing parts of a website that are unlikely to be of value for illegitimate purposes.

In an embodiment, the suspicious index manager 130 analyzes requests received from each session. The suspicious index manager 130 can classify requests as benign requests and potentially malicious requests. A benign request is a request that is unlikely to be of use for illegitimate purposes. For example, accessing a photo posted by a connection of the user in a social networking system is not likely to be of use for illegitimate purposes. On the other hand, attempts to access sensitive information, for example, social security number may be considered a potentially malicious request. In an embodiment, scores are assigned to different types of requests based on the degree of potential harm that a request can be associated with. The request pattern from a session can be analyzed to see the overall degree of potential harm associated with the request. The potential degree of harm associated with a session is determined based on statistical aggregate value obtained from measures of potential degree of harm of various requests associated with the session. A session sending a number of requests with an overall high degree of potential harm may be classified by the suspicious index manager 130 as a suspicious session.

In some embodiments, the netblock can be associated with geographical locations. Hence, the geographical distance between two netblocks can be estimated based on the geographical locations associated with the two netblocks. The geographical distance between netblocks can be used to derive safety information of sessions. For example, a session created from a netblock that has never been used by a user and is therefore not available in the list of safe or unsafe locations can be analyzed for its distance compared to known netblocks. A netblock within a predetermined distance of an unsafe netblock can be considered suspicious and require enhanced authentication. On the other hand a netblock within a predetermined distance of a safe netblock can be considered less suspicious and may require less severe authentication.

In another embodiment, information based on third party providers may be used for determining if a location is safe or unsafe. For example, a trusted third party provider may provide information that a netblock or IP address is not safe. Since the source of information is trusted, the locations determined to be unsafe by the third party provider can be added to a list of bad netblocks. In some embodiments a netblock that has been vetted for several other users or considered safe by a third party trusted source can be considered a safe location. This heuristic is based on the assumption that non-suspicious users are likely to occur in similar geographical locations or netblocks.

In an embodiment, geographical location from where a user session is created may be determined based on alternative means that are different from netblock associated with the user session. For example, the location of the device originating a session may be determined based on a global positioning system (GPS). The location identified by the GPS system or any alternative mechanism can be checked against a database of reputation of locations determined based on reputation of netblocks associated with the geographical locations. The reputation of the geographical location is used to determine the level of authentication requested from the session before access to information is allowed to the session.

Tracking Safe Locations of Users

In one embodiment, the system tracks a set of "safe" locations for each of the users. A location is an attribute of a session that is indicative of the client device 105 used for creating the session. A location associated with a session that has been successfully authenticated by a user is called a safe location. The safe locations associated with different users of the social networking system 115 are stored in the safe locations DB 155. A metric called suspicious index is created for new sessions based on locations of the session and historical data based on sessions created by the user in the past or netblock reputation that indicates how safe the session is estimated to be. Based on the value of the suspicious index of the session a determination is made regarding the severity of authentication required for the session.

Following are examples of locations that may be associated with sessions:

(1) Geographical location: The geographical location associated with the client device 105 can be obtained using the IP (internet protocol) address associated with the source of the user session. In one embodiment the geographical location is the city from where the session is created. The city associated with an IP address can be determined by using a lookup based on a table mapping cities to ranges of IP addresses. In an embodiment, the geographical location for a device may be determined using a GPS located on the device sending the request.

(2) Network Location: The network location of session can be obtained from the IP address associated with the session. In some embodiments, the network location is represented as a netblock that identifies a group of IP addresses. The netblock associated with an IP address can have a high correlation with the geographical location associated with the IP address. In some embodiments, an autonomous system number (ASN) can be obtained from the session that allows identification of a network associated with the session.

(3) Machine (cookie): The social networking system 115 can send a machine cookie to a client device 105 that is stored locally on the client device 105 and is unique to the client device with respect to the social networking system 115. The machine cookie can be retrieved by the social networking system 115 to verify the identity of the client device 105. In one embodiment, the machine cookie is a 64-character string. The machine cookie is a highly reliable mechanism for recognizing a client device 105. For a cookie to be available on the client device 105, the client device must have previously established a connection with the social networking system 115 allowing a cookie to be stored on the device. If the cookie is deleted by the user, a new cookie may be stored on the device the next time the device is used to connect to the social networking system 115.

Figure 3:
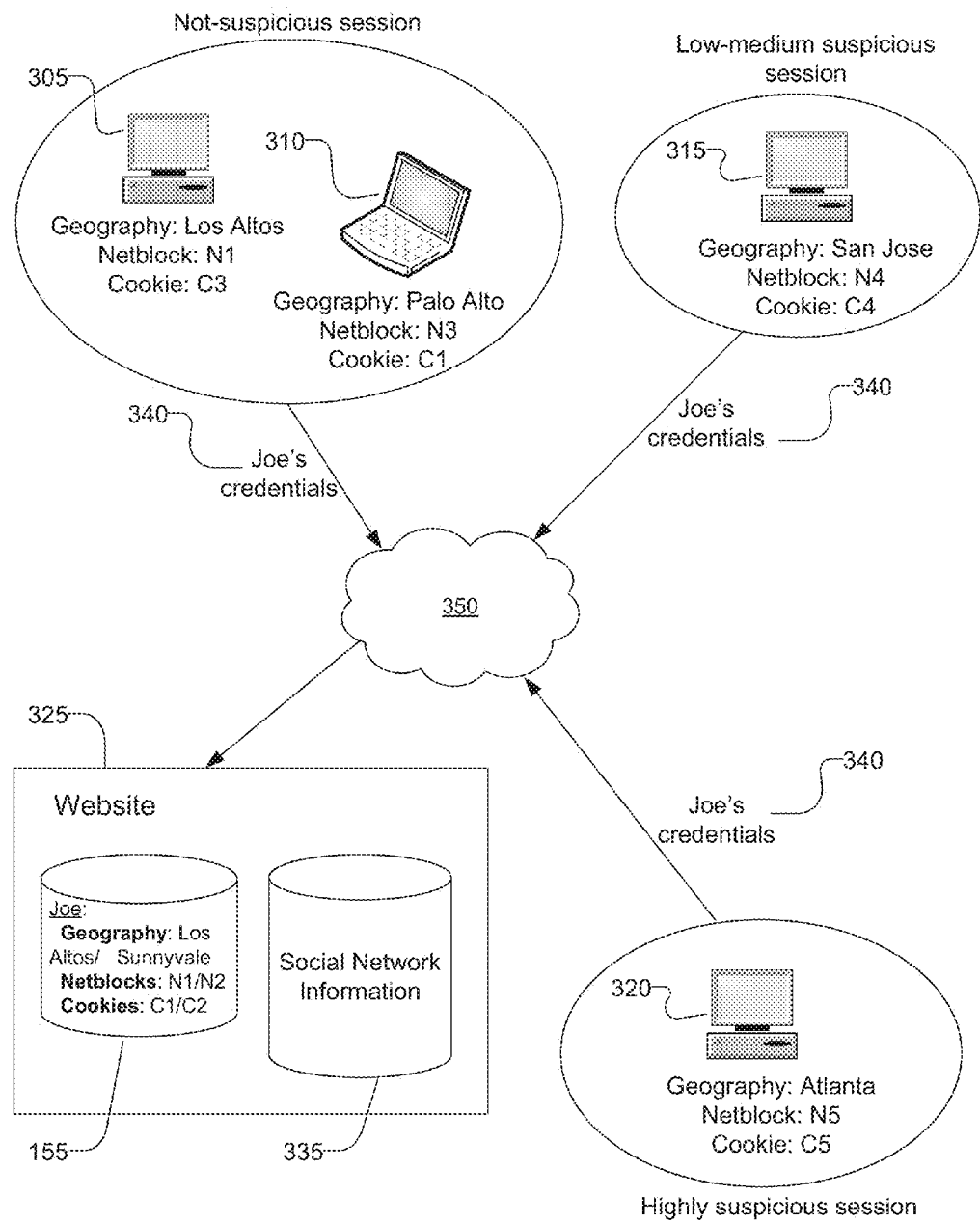
FIG. 3 is a high-level diagram illustrating how locations associated with a session created by a user can be used to distinguish between illegitimate user sessions and legitimate user sessions.

As shown in FIG. 3, a user Joe may use the location 305 to connect from home and location 310 to connect from work with the help of the network 350. Occasionally the user may create a session from an alternate location 315. For example, the user visiting a friend's house may connect (create a session) from the friend's computer. However, the chances of a user creating a session from a location drastically different from the usual set of locations are low. For example, it is unlikely that the user would create a session from computer 320, situated far from the usual locations associated with the user. A session created from a location that is drastically different from the usual locations of a user is suspected to be an illegitimate session, e.g., created by a phisher who stole the user's credentials. Similarly, a session may be considered suspicious if it is created from a location that has a history of creating suspicious sessions or a history of sessions that have been involved in illegitimate activity like spamming. A session considered suspicious may be subjected to additional authentication by the user and actions performed by the session may be monitored more closely for illegitimate activity.

FIG. 3 illustrates a system 325 that maintains information in the safe locations DB 155 that can be used to determine whether a session is safe or not. For example, the safe locations DB 155 stores the information that the safe geographical locations used by Joe in the past include Los Altos and Sunnyvale, the safe netblocks used by Joe include N1 and N2 and safe cookies stored on Joe's computers include C1 and C2. A user session from the computer 305 can be considered safe since it is associated with geographical location Los Altos and netblock N1 that are known safe locations for user Joe. Similarly, a user session created from computer 310 can also be considered safe since it has a known machine cookie C1 even though the geographical location Palo Alto and netblock N3 have never been used before by Joe. The user session from computer 315 can also be considered safe although the geographical location as well as the netblock and cookie not known to be safe since the geographical location is within a reasonable threshold, for example, within 50 miles of known geographical locations used by Joe, for example, Los Altos. However the user session created from computer 320 may be treated as somewhat suspicious until it is authenticated by the user. A user session created from computer 320, although based on credentials 340 of Joe is considered highly suspicious since the geographical location, netblock and cookie of the user session have never been used by Joe in the past as determined by the safe locations DB 155 and the geographical location Atlanta is significantly far from any location used by Joe in the past. Hence the user session created from computer 320 can be considered safe only if the session passes enhanced authentication.

The safe locations DB 155 can be initially populated with a set of locations based on historic information associated with user sessions. For example, session history may be stored in action log 140. The offline batch process, also referred to as offline vetting can analyze historic data associated with sessions to obtain safe locations for a user. The offline process can also be used to expand an existing set of safe locations for a user. The locations added to the safe locations DB 155 for a user are the locations associated with sessions properly authenticated by the user, excluding known illegitimate locations that may be available in the known phisher DB 145. In some embodiments, safe locations based on machine cookies are not added during the initial population of the safe locations DB 155. The login patterns of a user stored in the action log 140 can be analyzed to determine safe locations for a user. For example, a user exhibiting activity on the social networking system 115 that is atypical of an illegitimate user (or, typical of a legitimate user) is considered evidence that the location can be considered vetted. Similarly a user logging repeatedly from the same location for more than a predetermined number of times can be considered evidence that the location is safe. Once a location is determined safe and added to the safe location DB 130, the location can be used by the user without requiring enhanced authentication.

Figure 4:
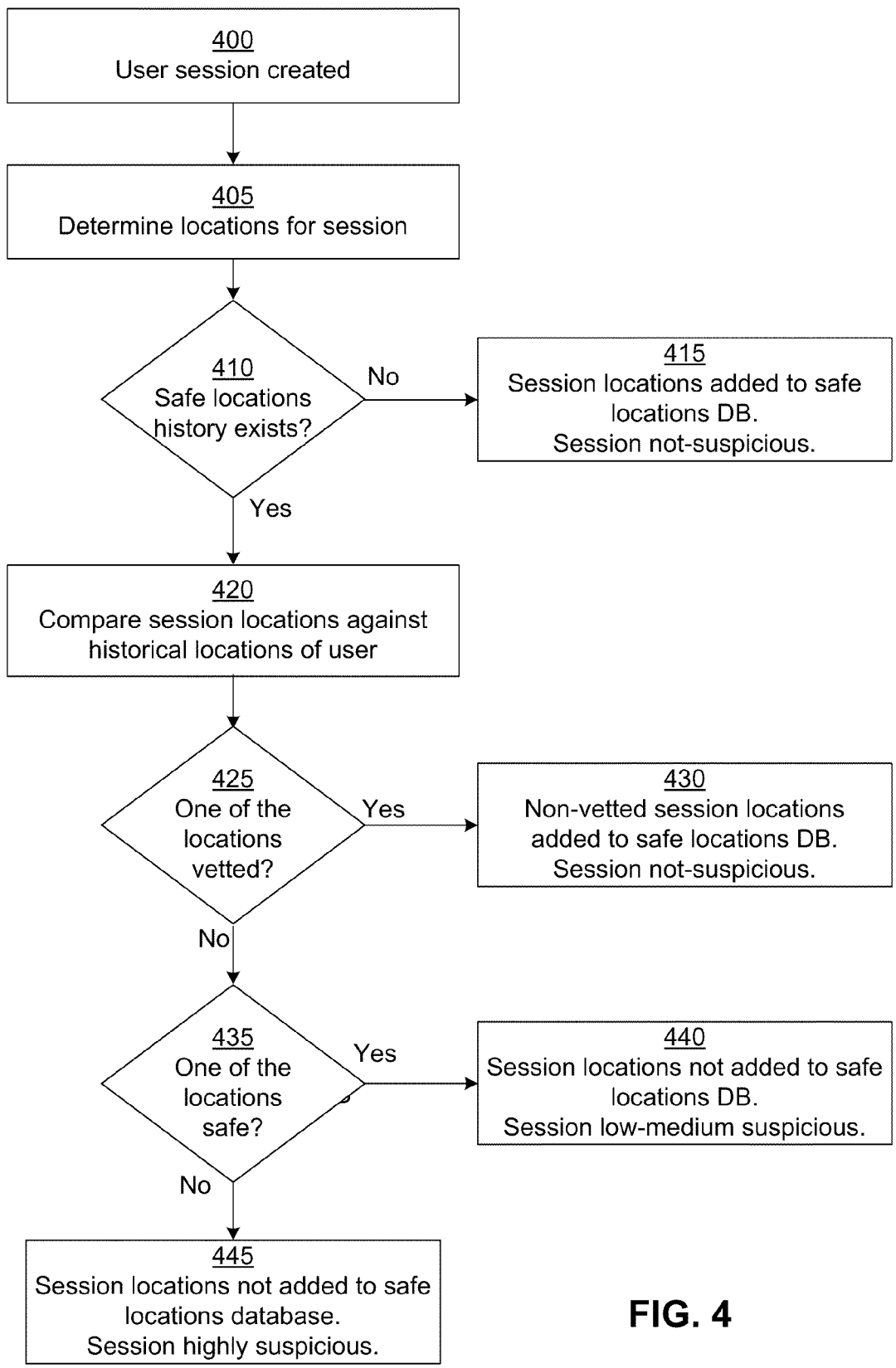
FIG. 4 is a flowchart of the process illustrating how a suspicious index is determined for a user session.

The expanding of the safe locations associated with a user in the safe locations DB 155 occurs by the process of online vetting that refers to a process of determining safe locations based on live user sessions. FIG. 4 describes the process used to determine whether a location associated with a user session can be added to the safe locations DB 155 and also to make a determination whether the session is suspicious or not. The process illustrated in FIG. 4 determines the suspicious index value for a user session to be one of "not suspicious," "low-medium suspicious," or "highly suspicious." The flowchart in FIG. 4 can be adapted to return a binary suspicious index with two possible values, "safe" and "not safe," for example, sessions determined to be "not suspicious" or "low-medium suspicious" may be considered "safe" whereas sessions determined to be "highly suspicious" considered "not safe. Alternatively, the suspicious index can be a numeric value based on weighted average of scores assigned to individual factors used to determine how safe a session is. For example a score assigned to a session with a safe machine cookie may be higher than the score assigned to a session based on geographical location. Furthermore, the score assigned to a user session based on multiple safe locations can be higher than a session based on a single safe location.

When the session manager 135 creates 400 a user session, the session manager 135 determines 405 locations associated with the session. The session manager 135 checks 410 the safe locations DB 155 to determine if there is any historical data available for the user. If no historical data exists for the user, the locations associated with the session are considered safe and added 415 to the safe locations DB 155. In an embodiment, enhanced authentication may be required before adding 415 the locations associated with the session to the safe locations DB 155. The session is considered not-suspicious when there is no existing history in the safe locations DB 155 since it is likely to be one of the first sessions created by a user and is less likely to have been stolen.

If historical data is available for the user, the historical locations retrieved from the safe locations DB 155 for the user are compared 420 against the session locations. If any of the session locations match the historical locations of the user in the safe locations DB 155, the matching session location is considered vetted. A match between two locations is successful if the two locations are considered equivalent. In an embodiment, the match is based on a string match, for example, two machine cookies may be considered equivalent if they are exact string matches of each other. In another embodiment, the match may be a fuzzy match and not necessarily an exact string match. For example, addresses of two geographical locations may be represented in different ways but considered a match if the analysis of the addresses indicates that the two addresses represent the same geographical location.

If a determination is made 425 that at least one session location is vetted, the session is considered not-suspicious and the remaining locations associated with the session are added 430 to the safe locations DB 155. Each session that has at least one vetted location and other non-vetted locations results in the non-vetted locations being added to the safe locations DB 155, thereby expanding the information in the safe locations DB 155. For example, if the netblock and geographical location associated with the user session are not vetted but the machine cookie is vetted, the session is likely to be created by a person travelling with a laptop. Hence the vetting of the machine cookie is sufficient to cause the session's geographical location and netblock to be added to the safe locations DB 155. In some embodiments, a location that has not been used by a user for a period of time longer than a predetermined threshold value, for example thirteen months, the location is removed from the list of safe locations for the user.

In some embodiments, if the user session is considered low-medium suspicious, the user is allowed access to the site based on enhanced authentication that is simpler than the enhanced authentication required for a highly suspicious session. In other embodiments, a user session considered low-medium suspicious may be allowed access to the website but monitored more closely for any suspicious activities. For example, a low medium suspicious session that engages in suspicious activity including spam can be terminated. Furthermore, the locations associated with the session that engages in suspicious activity can be added to the known phisher DB 164 and the cookie and netblock added to a blocked locations list for the user. The locations belonging to the blocked locations list for a user are checked for determining the suspicious index for the user and may be regarded as highly suspicious for subsequent sessions.

If none of the locations associated with the session can be vetted, heuristics can be used to determine 435 if any location associated with the session can be considered safe. For example, a geographic location can be considered safe if it is within a predetermined distance of a vetted geographic location. In a particular geographical region, people may be expected to travel a threshold distance on an average for business or personal reasons. If the new location associated with the session is within a reasonable value of the threshold distance traveled, the location can be considered safe. On the other hand, if the new location is at a significant distance from any vetted location compared to the threshold distance, the new location is not considered safe.

In some embodiments, a threshold distance may be predetermined for each geographical region. If at least one location is considered safe but none of the locations associated with the session are vetted, the session is considered 440 low-medium suspicious and the locations associated with the session may not be added to the safe locations DB 155. If none of the locations are vetted or considered safe, the session is considered 445 highly suspicious and none of the locations associated with the session are added to the safe locations DB 155.

In some embodiments, if the machine cookie obtained from a session has a length different from an expected length, the session is considered highly suspicious. In some embodiments, the machine cookie is created such that a part of the cookie is created by applying a hash algorithm to another part of the cookie. For example, the last 32-characters of the cookie may be created by applying a hash algorithm to the first 32-characters. A check is made to verify if the session cookie was created by applying the appropriate algorithm. If the check indicates that the cookie was not created by the appropriate mechanism, the session is considered highly suspicious.

Learning New Safe Locations for a User

The information available for a user in the safe locations DB 155 increases over time based on the process described in FIG. 4. Location information from a session that is not available in the safe locations DB 155 can be added to the safe locations DB 155 in following situations:

(1) When a session with no known safe locations is properly authenticated by the user. All locations associated with the session can be added to the safe locations DB 155 as safe locations for the user.

(2) When some locations associated with the session are not known safe locations but at least one location is determined to be a safe location. The locations of the session that are not known safe locations may be added to the safe locations DB 155. In some embodiments, the location determined to be safe for the session must be of a particular kind associated with very high reliability before other locations of the session are added to the safe locations DB 155. For example, a session considered safe only because the geographical location was determined safe may not result in the other locations, for example, netblock and machine cookie getting added to the safe locations DB 155. On the other hand, a session created with a known safe location based on machine cookie may be considered safe enough that locations, for example, geography and netblock associated with the session are added to the safe locations DB 155.

The information available in the safe locations DB 155 for a user is likely to grow over time as the user creates more and more sessions, similar to a learning system that increases its knowledge over time. A typical user is likely to have a limited set of locations from where the user connects. Over a significant time interval, there is a very significant chance that the user has connected from all usual locations resulting in all the usual locations of the user being added to the safe locations DB 155. In less frequent cases when the user connects from a new location, enhanced authentication is required before determining the new locations to be safe.

Using Safe Locations of a User's Connection

In one embodiment, the website 325 is a social networking website or otherwise maintains information 335 related to friends of the website's users. In an embodiment, the website 325 may not maintain the social network information 335 but obtain the information from a social networking system using an application programming interface (API) provided by the social networking system. As used herein, the term "friend" refers to any other user to whom a user has formed a connection, association, or relationship via the social network. The information related to a user's connections in a social network may be used to determine whether a session is legitimate or not. For example, a user is likely to use a computer belonging to a social network connection to create a session to the website 325. The user may have never created a session from the computer in the past, but if the website can determine that the computer has been used in the past by the user's connections, the user session may be considered safe. In one embodiment, a user session created from a geographical location from where a large number of user's connections create sessions may be considered safe.

A social networking system stores significant information related to a user's connections that can be used to determine if a user session is legitimate or not. Users of the social networking system add connections to a number of other users to whom they desire to be connected. Connections may be added explicitly by a user, for example, the user selecting a particular other user to be a connection, or automatically created by the social networking system based on common characteristics of the users (e.g., users who are alumni of the same educational institution). The social networking system keeps a record of information for each user and the connections among the users. The record of users and their connections in the social networking system may be called a "social graph."

Connections in social networks are usually in both directions, but they need not be, so the terms "user" and "friend" may depend on the frame of reference. For example, if Bob and Joe are both users and connected to each other in the website, Bob and Joe are also each other's friends. The connection between users may be a direct connection; however, some embodiments of a social networking system allow the connection to be indirect via one or more levels of connections. Also, the term friend need not require that users actually be friends in real life; it simply implies a connection in the social network. A social networking system provides various mechanisms to its users to communicate with each other and to obtain information about their connection that they might find interesting, such as activities that their connections are involved with, applications that their connections are installing, and comments made by connections on activities of other connections. These mechanisms include email, notifications, newsfeeds and the like. Users of a social networking system can view information related to other users, for example, their profile information, photos, and the like. Interactions between users on a social networking system may be analyzed to determine if two users are close connections or not. For example, two users with very frequent interactions through emails or other activities in the social networking system are likely to be closer connections than users with minimal activity between them.

Social graph information associated with a user may be used for determining safe locations for a user. For example, a location may be considered safe for a user if the location is known to be safe for one of the connections of the user. A geographical location may be considered safe for a user if the geographical region is known to be safe for several of the user's connections. Similarly, a machine cookie can be considered safe for a user if the machine cookie is known to be a safe location for a user's connection. In a situation where a location is not known to be safe for a user but is known to be safe for the user's connections, it is likely that the user is using a machine of a connection or using a machine from the geographical location of the user's connections. In some embodiments a score is assigned to connections of a user to determine if the connections are close before using the particular connection for determining safe locations. In some embodiments, heuristics may be used to determine how close a connection is to a user before using the connection's information for determining safe locations. Distinction based on closeness of connections is used because some users create a large number of connections spread across a wide variety of locations. Such users can be potentially exploited by illegitimate users by becoming their connections in the social networking system and being able to get added to the user's safe locations. Hence, the list of connections of a user may be restricted to connections with whom the user has interactions indicative of a close friendship, for example, connection with whom the user has frequent interactions using messages, connections that have been tagged with the user in the same photo, or other types of interactions. In some embodiments, a location may be considered safe for a user if the location is considered safe for any of the connections of the user or any of the connections of the connections of the user.

Enhanced Authentication Procedure

Figure 5:
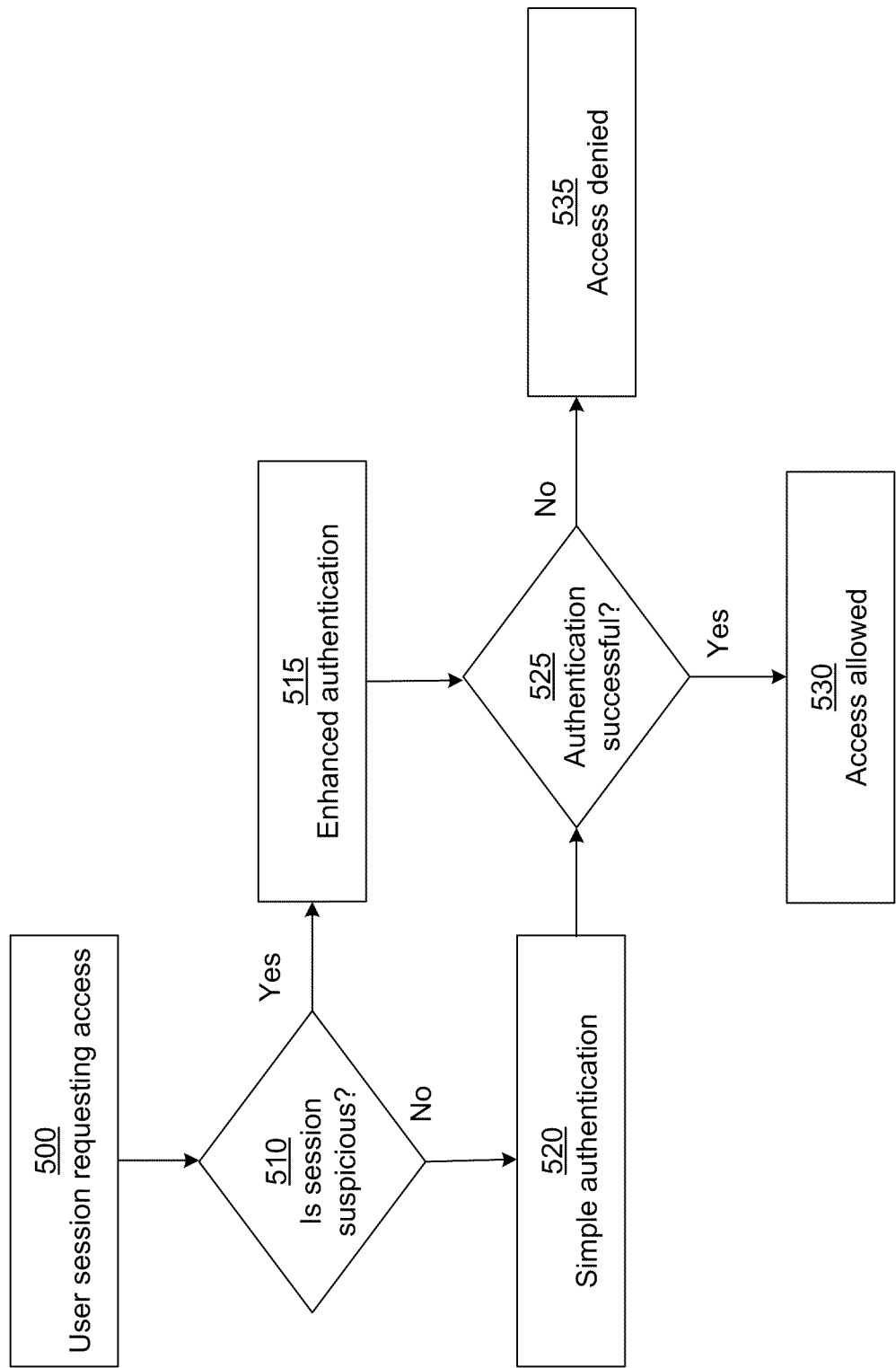
FIG. 5 is a flowchart of a process illustrating how information related to a session being suspicious is used to determine the level of authentication required to allow access to the website.

Allowing access to a session that is highly suspicious requires enhanced authentication from the user. FIG. 5 illustrates a process in which the level of authentication required for a session is determined based on how suspicious the session is considered. A session requesting 500 access to information is analyzed by the session manager 135 to determine 510 whether the session is suspicious or not. The session manager 135 provides the information associated with the session to the suspicious index manager 130 to determine a measure of suspiciousness associated with the session. If the session is determined to be not suspicious, a simple authentication process 520, for example, authentication based on a login identifier and password may be sufficient. On the other hand, if the session is determined to be suspicious, enhanced authentication 515 may be required based on information from the user. For example, as part of an enhanced authentication process, the authentication manager 160 may request a preselected set of security related questions for which the user has previously provided answers or require the user to enter a security code that is sent to the user through email or an SMS message sent to the user's mobile phone. The success of the authentication procedure is used to determine 525 the level of access to the user session. Access is allowed 530 if authentication succeeds and denied 535 otherwise. In some embodiments, a session that is not successfully authenticated may be allowed partial access, such that access to any sensitive information is disallowed. Furthermore, a session that is not successfully authenticated may be monitored more closely for any suspicious activity and terminated if activities of the session are indicative of a behavior considered not safe, for example, spamming.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
  receiving a request for creating a session from a computing device;
  identifying a location associated with the computing device originating the request;
  receiving a measure of reputation of the location, wherein the measure of reputation of the location is determined based at least in part on a set of past sessions of a plurality of other users that originated from the location, the measure of reputation indicating the location as being safe if more than a threshold of past sessions correspond to benign requests, wherein a request is classified as a benign request if the request is for access to information of a user by another user connected to the user via a social networking system;
  determining a level of authentication required from the sender of the request based on the measure of reputation of the location; and
  sending a request for authentication, wherein the information requested for authentication is determined based on the determined level of authentication.

2. The computer implemented method of claim 1, wherein the measure of reputation of the location indicates an unsafe location if a number of suspicious sessions originating from the location in the past is above a predetermined threshold.

3. The computer implemented method of claim 1, wherein the measure of reputation of the location is further based on a measure of reputation of a second location that is within a threshold distance of the location.

4. The computer implemented method of claim 3, wherein the measure of reputation of the location is further determined based on a distance of the location from the second location.

5. The computer implemented method of claim 1, wherein a past session is determined to be suspicious if the past session was associated with an activity considered unsafe.

6. The computer implemented method of claim 1, wherein a past session is determined to be suspicious if the past session was associated with an illegitimate activity.

7. The computer implemented method of claim 1, wherein a past session is determined to be suspicious if the past session sent a request for access to information of a type classified as sensitive information.

8. The computer implemented method of claim 1, wherein a past session is determined to be suspicious if the past session failed an authentication.

9. The computer implemented method of claim 1, further comprising:
receiving a measure of reputation for each of a plurality of locations from a third-party service provider.

10. The computer implemented method of claim 1, further comprising:
generating a measure of reputation for each of a plurality of locations based on actions executed by previous sessions.

11. The computer implemented method of claim 1, wherein the level of authentication required from the sender of the request comprises a captcha.

12. The computer implemented method of claim 1, wherein the location is a geographical location.

13. The method of claim 1, wherein a benign request comprises a request for an image of another user with whom the user is directly connected in a social networking system.

14. The method of claim 1, wherein a benign request comprises a request for information classified as not sensitive.

15. The method of claim 1, wherein a benign request comprises a request to perform an action predetermined to be a legitimate action.

16. A computer implemented method comprising:
receiving information related to a plurality of sessions originating from a location, wherein a session originating from a location is created from device associated with the location;
determining a measure of suspiciousness for each session in the plurality of sessions based on actions associated with the session indicating authenticity of the session;
determining a measure of reputation of the location based on past sessions of a plurality of other users originating from the location, wherein the measure of reputation indicates the location as being safe if more than a threshold past sessions correspond to benign requests, wherein a request is classified as a benign request if the request is for access to information of a user by another user connected to the user via a social networking system;
determining a level of authentication required for sessions originating from the location based on the reputation of the location; and
storing the determined measure of reputation of the location in a computer readable medium.

17. The computer implemented method of claim 16, wherein the location is a netblock and the session was created from a network address in the netblock.

18. The computer implemented method of claim 16, wherein the location is a geographical location.

19. The computer implemented method of claim 16, wherein the actions associated with the session indicating the authenticity of the user creating the session comprise requests from the session attempting to access information of a type classified as sensitive information.

20. The computer implemented method of claim 16, wherein the actions associated with the session indicating the authenticity of the user creating the session comprise a failure of the session to provide authentication information.

21. A computer program product having a non-transitory computer-readable storage medium storing computer-executable code comprising:
a session manager configured to:
receive a request for creating a session from a computing device;
identify a location associated with the computing device originating the request;
receive a measure of reputation of the location, wherein the measure of reputation of the location is determined based at least in part on past sessions of a plurality of other users that originated from the location, the measure of reputation indicating the location as being safe if more than a threshold past sessions correspond to benign requests, wherein a request is classified as a benign request if the request is for access to information of a user by another user connected to the user via a social networking system;
an authentication manager configured to:
determine a level of authentication required from the sender of the request based on the measure of reputation of the location; and
send a request for authentication, wherein the information requested for authentication is determined based on the determined level of authentication.

22. A computer program product having a non-transitory computer-readable storage medium storing computer-executable code comprising:
a suspicious index manager configured to:
receive information related to a plurality of sessions originating from a location, wherein a session originating from a location is created from device associated with the location;
determine a measure of suspiciousness for each session in the plurality of sessions based on actions associated with the session indicating authenticity of the session;
determine a measure of reputation of the location based on an aggregate of measures of suspiciousness of sessions of a plurality of other users originating from the location, wherein the measure of reputation indicates the location as being safe if more than a threshold past sessions correspond to benign requests, wherein a request is classified as a benign request if the request is for access to information of a user by another user connected to the user via a social networking system;
determining a level of authentication required for sessions originating from the location based on the reputation of the location; and
store the determined measure of reputation of the location in a computer readable medium.

* * * * *